(12) United States Patent
Fujita

(10) Patent No.: US 11,323,182 B2
(45) Date of Patent: May 3, 2022

(54) TRANSMITTING AND RECEIVING DEVICE, TERMINAL DEVICE, AND TRANSMITTING AND RECEIVING SYSTEM

(71) Applicant: THINE ELECTRONICS, INC., Tokyo (JP)

(72) Inventor: Yusuke Fujita, Tokyo (JP)

(73) Assignee: THINE ELECTRONICS, INC., Tokyo (JP)

(*) Notice: Subject to any disclaimer, the term of this patent is extended or adjusted under 35 U.S.C. 154(b) by 0 days.

(21) Appl. No.: 17/359,955

(22) Filed: Jun. 28, 2021

(65) Prior Publication Data

US 2021/0409121 A1 Dec. 30, 2021

(30) Foreign Application Priority Data

Jun. 29, 2020 (JP) .............................. JP2020-111680

(51) Int. Cl.
*H04B 10/50* (2013.01)
*H04B 10/69* (2013.01)

(52) U.S. Cl.
CPC ..... *H04B 10/50572* (2013.01); *H04B 10/695* (2013.01)

(58) Field of Classification Search
CPC .................. H04B 10/50572; H04B 10/695
See application file for complete search history.

(56) References Cited

U.S. PATENT DOCUMENTS

| | | | |
|---|---|---|---|
| 5,043,992 A | 8/1991 | Royer et al. | |
| 6,996,136 B1* | 2/2006 | Carruthers | H01S 3/067 372/106 |
| 8,521,019 B2 | 8/2013 | Bradbeer | |
| 8,989,227 B1 | 3/2015 | Yang | |
| 2014/0204396 A1* | 7/2014 | Giger | H01S 5/0014 356/614 |
| 2017/0125892 A1* | 5/2017 | Arbabian | A61B 5/686 |
| 2018/0062749 A1* | 3/2018 | Rector | H04B 10/0799 |
| 2018/0196287 A1* | 7/2018 | Hissen | G02F 1/0121 |
| 2019/0089466 A1* | 3/2019 | Li | H04L 25/4917 |
| 2019/0327002 A1* | 10/2019 | Foong | H04B 10/695 |
| 2021/0126594 A1* | 4/2021 | Lambrecht | H03F 3/082 |

* cited by examiner

*Primary Examiner* — Mina M Shalaby
(74) *Attorney, Agent, or Firm* — Sughrue Mion, PLLC

(57) ABSTRACT

A transmitting and receiving device includes a controller, a driver, a specific pattern generator, a transmitting signal detector, an amplifier, a differential amplifier, an average current detector, and a received signal detector. In a non-signal period, the controller causes a current signal to be input from the driver to a laser diode and causes an optical signal to be output from the laser diode. When an optical signal of a specific pattern output from the other-side laser diode reaches a photodiode over a period of length that depends on an average value of a current signal output from the other-side photodiode that receives the optical signal, the controller adjusts a magnitude of the current signal input from the driver to the laser diode based on the length of the period of the optical signal of the specific pattern.

11 Claims, 10 Drawing Sheets

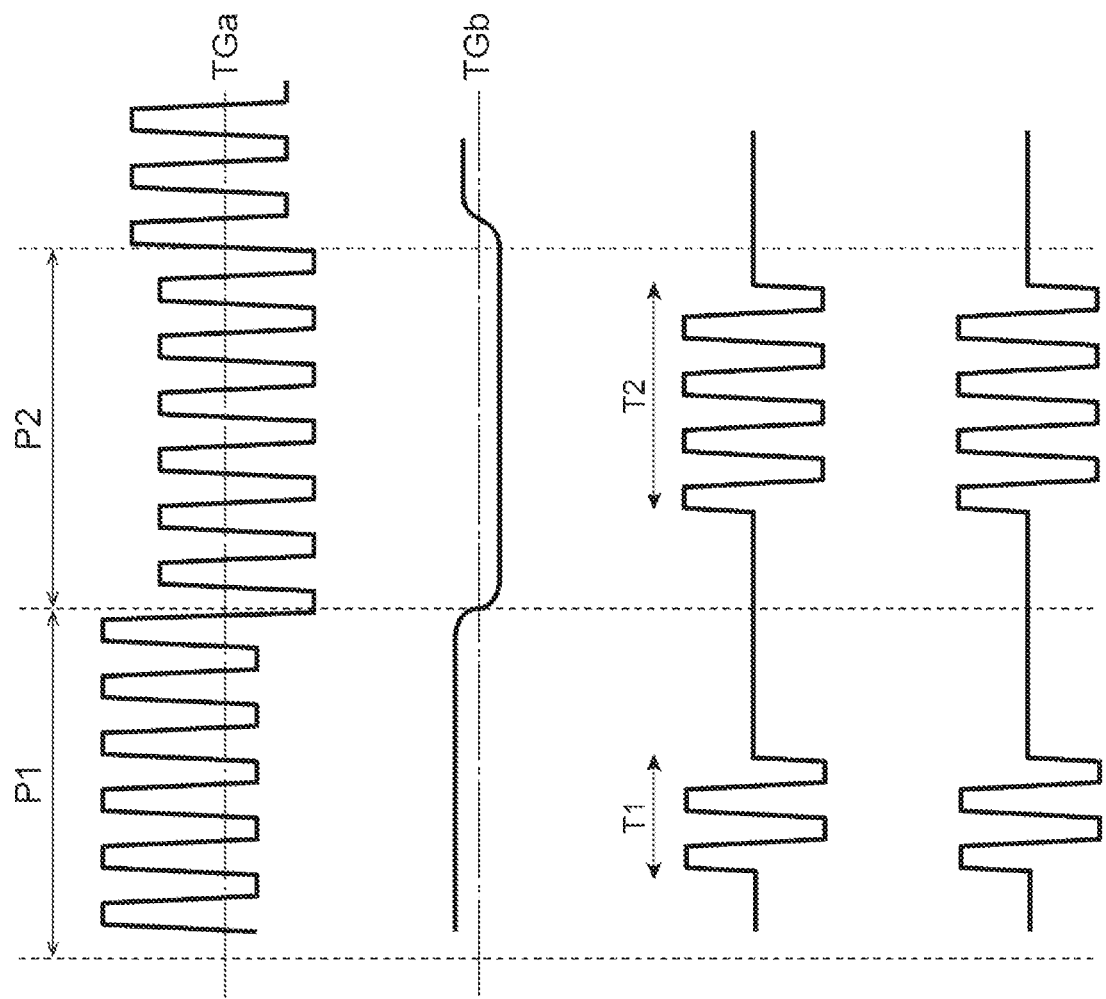

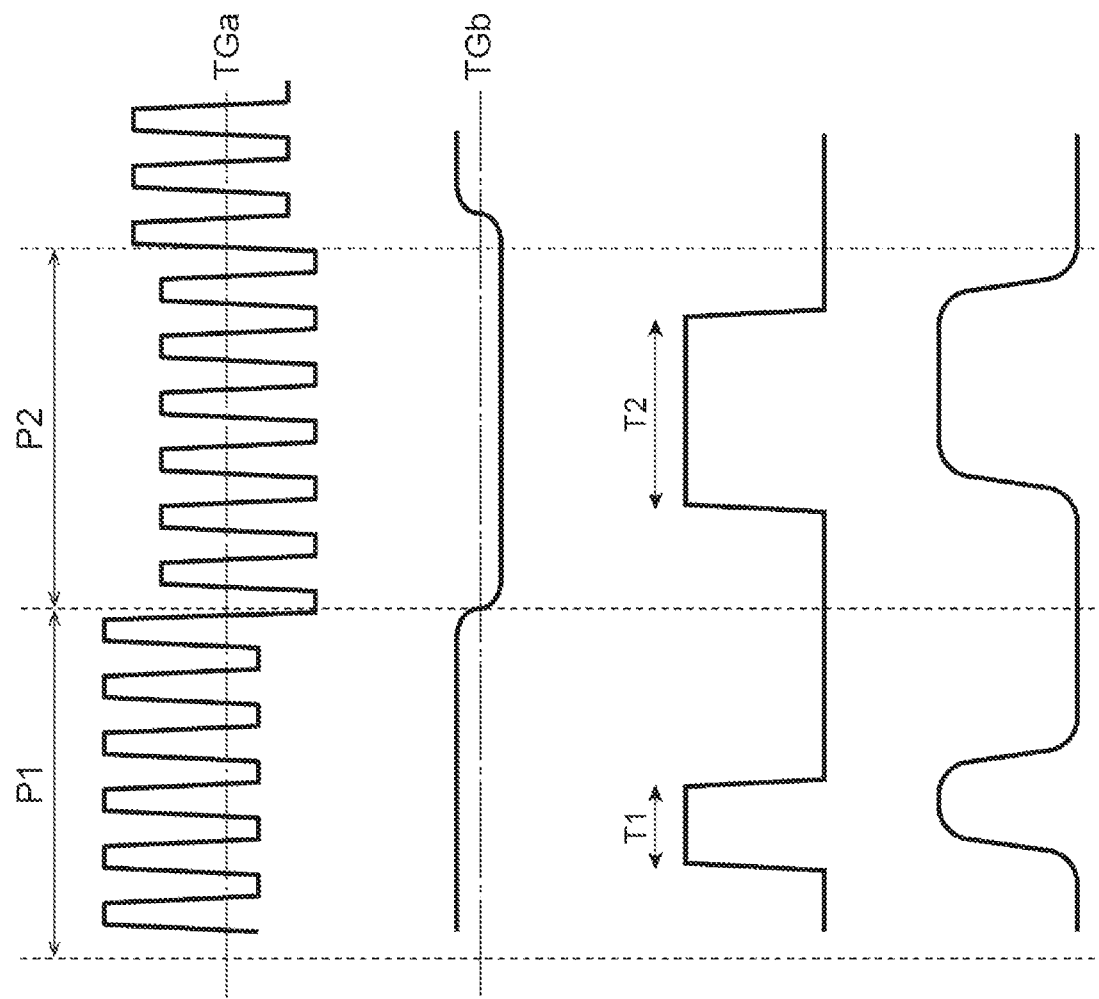

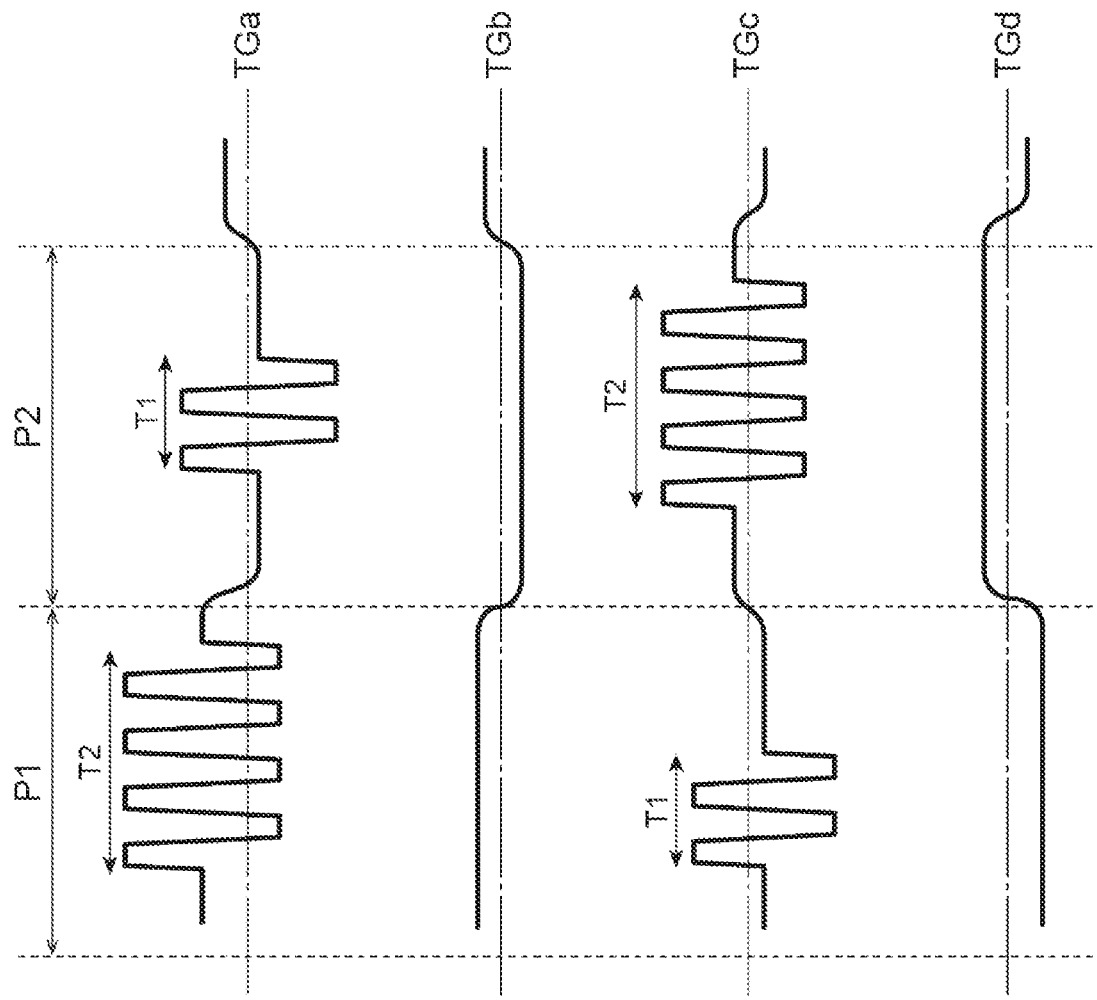

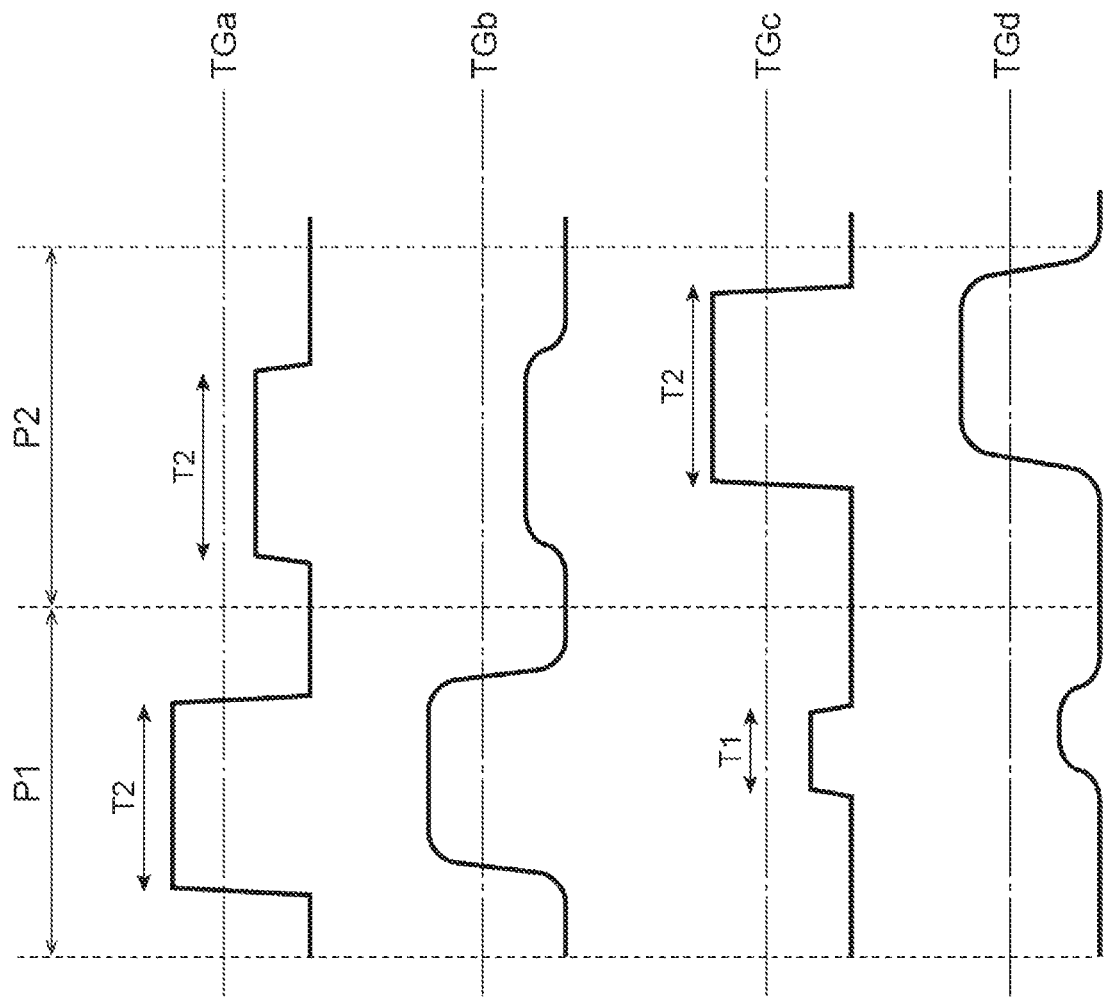

TRANSMITTING AND RECEIVING DEVICE, TERMINAL DEVICE, AND TRANSMITTING AND RECEIVING SYSTEM

TECHNICAL FIELD

The present invention relates to a transmitting and receiving device, a terminal device, and a transmitting and receiving system.

BACKGROUND

In a transmitting and receiving system that performs communication by transmitting an optical signal, an optical signal output from a laser diode based on an electric signal in a transmitting side terminal device is received by a photodiode of a receiving terminal device, and is converted into an electric signal. The intensity modulation pattern of the optical signal corresponds to the intensity modulation pattern of the electric signal to be transmitted.

Bidirectional communication is possible by transmitting an optical signal in the opposite direction as well. An optical fiber is used as a transmission line for transmitting the optical signal from the laser diode to the photodiode. In this case, long-distance optical transmission with low loss is possible.

A driver that drives the laser diode generates a current signal based on an electric signal (voltage signal) to be transmitted, and supplies the current signal to the laser diode so that an optical signal corresponding to the current signal is output from the laser diode. A photodiode that receives the optical signal outputs a current signal corresponding to the amount of light received. The current output from the photodiode is very small. An amplifier converts a small current signal output from the photodiode into a voltage signal having a sufficient amplitude, and outputs the voltage signal. The amplifier that converts a current signal into a voltage signal is called a transimpedance amplifier (TIA).

Each of the driver and the amplifier can be formed on a silicon chip as an inexpensive circuit that can operate at high speed. The laser diode cannot be formed of silicon, and is formed on a compound semiconductor chip. The photodiode can be formed of silicon. However, since the optimal process for the driver is different from the optimal process for the amplifier, the driver and the amplifier are formed on different chips. Therefore, the driver and the amplifier can be formed on the same silicon chip, but the laser diode and the photodiode become different chips.

FIGS. 1 and 2 are diagrams showing the relationship between the output light power P of an optical signal LS in a laser diode and the supply current value I of a current signal CS. The supply current value I changes with time t. The output light power P changes with time t. As shown in these diagrams, the laser diode hardly emits light in a range where the supply current value I is smaller than a threshold current $I_{TH}$. On the other hand, in a range where the supply current value I is larger than the threshold current $I_{TH}$, the output light power P of the laser diode corresponds to the supply current value I. FIG. 1 shows a case where the current signal CS input into the laser diode is always larger than the threshold current $I_{TH}$. FIG. 2 shows a case where the L level of the current signal CS input into the laser diode is smaller than the threshold current $I_{TH}$.

The time at which the supply current value I to the laser diode transitions from L level to H level is assumed to be $T_1$, and the time at which the output light power P of the laser diode transitions from L level to H level in response to the above transition is assumed to be $T_P$. As shown in FIG. 2, the L level of the current signal CS input into the laser diode is smaller than the threshold current $I_{TH}$. In this case, turn-on delay that is defined by a period from the time $T_1$ to the time $T_P$ ($T_P$–$T_1$) randomly changes to cause jitter. In addition, as shown in FIG. 2, when the L level of the current signal CS input into the laser diode is smaller than the threshold current $I_{TH}$, the output light power P of the optical signal LS of the laser diode after the current signal CS transitions from the L level to the H level causes ringing (temporal change) due to relaxation vibration, which also causes jitter. In order to suppress the occurrence of jitter by suppressing the ringing and the random change of the turn-on delay, the L level of the current signal CS input into the laser diode is required to be larger than the threshold current $I_{TH}$, as shown in FIG. 1.

Assuming that the value of the output light power P of the laser diode at the H level is $P_H$ and the value of the output light power P of the laser diode at the L level is $P_L$ ($=\alpha P_H$), the extinction ratio defined by the ratio ($P_H/P_L$) between the two values is $1/\alpha$. Considering that the level of the optical signal LS is reliably identified by the photodiode, it is desirable that the extinction ratio is large.

In order to sufficiently suppress the jitter of the output light power P, it is desirable that the L level of the current signal CS input into the laser diode is sufficiently larger than the threshold current. On the other hand, in order to increase the extinction ratio of the output light power P, it is desirable that the L level of the current signal CS input into the laser diode is small in a range equal to or greater than the threshold current. That is, there is a trade-off relationship between suppressing jitter and securing the extinction ratio. Therefore, it is desirable that the L level and H level of the current signal CS input into the laser diode are set to appropriate values in consideration of both suppressing jitter and ensuring the extinction ratio.

However, the threshold current of the laser diode changes greatly due to temperature change and aging deterioration. For example, when the temperature rises by 1° C., the threshold current increases by 1% to 2%. Therefore, even if the L level and H level of the current signal CS input into the laser diode are set to appropriate values, when the threshold current changes due to temperature change or aging deterioration, jitter suppression is not sufficient or the extinction ratio worsens if the settings are left as they are. In addition, if the L level and the H level of the current signal CS input into the laser diode are set to be larger than appropriate values in preparation for an increase in the threshold current, the power consumption increases.

In a device disclosed in Patent Document 1, in a transmitting side terminal device, the magnitude of a current signal supplied from a driver to a laser diode is adjusted based on the temperature. That is, in this device, the threshold current increases as the temperature rises, so that the current signal is increased, and the threshold current decreases as the temperature drops, so that the current signal is decreased.

In a device disclosed in Patent Document 2, in a transmitting side terminal device, a monitoring photodiode is disposed in the vicinity of a laser diode, and the power of light output from the laser diode is detected by the monitoring photodiode. Then, in this device, the magnitude of the current signal supplied from the driver to the laser diode is adjusted so that the average value of the detected output light power becomes constant.

In a device disclosed in Patent Document 3, the average output current of a photodiode that receives an optical signal in a receiving side terminal device is detected, and an electric signal corresponding to the detected value is transmitted from the receiving side terminal device to the transmitting side terminal device. Then, in this device, in the transmitting side terminal device, the magnitude of the current signal supplied from the driver to the laser diode is adjusted based on the electric signal transmitted from the receiving side terminal device.

Patent Document 1 to Patent Document 3 described above are as follows.
Patent Document 1: U.S. Pat. No. 5,043,992
Patent Document 2: U.S. Pat. No. 8,989,227
Patent Document 3: U.S. Pat. No. 8,521,019

SUMMARY

When adjusting the magnitude of the current signal supplied from the driver to the laser diode, the device disclosed in Patent Document 1 does not perform feedback control based on the output light power of the laser diode but performs feedback control based on the temperature. For this reason, it is difficult to adjust the magnitude of the current signal with high accuracy. In addition, this device cannot solve the problem of change of the threshold current due to aging deterioration of the laser diode.

When adjusting the magnitude of the current signal supplied from the driver to the laser diode, the device disclosed in Patent Document 2 performs feedback control based on the output light power of the laser diode. Therefore, it is possible to adjust the magnitude of the current signal with high accuracy, and it is possible to solve the problem of change of the threshold current due to aging deterioration of the laser diode. In this device, however, since it is necessary to use an expensive laser diode around which a monitoring photodiode is disposed, the cost of the system increases.

In the device disclosed in Patent Document 3, it is necessary to provide a copper wire for transmitting an electric signal, which corresponds to the detected value of the average output current of the photodiode that receives the optical signal in the receiving side terminal device, to the transmitting side terminal device. Therefore, the cost of the system increases.

There is a request for a transmitting and receiving system that can perform bidirectional communication by transmitting the optical signal output from the laser diode so that the magnitude of the current signal supplied to the laser diode can be adjusted with high accuracy using an inexpensive configuration. In addition, there is a request for a terminal device used in such a transmitting and receiving system and a transmitting and receiving device included in the terminal device.

A transmitting and receiving device (first transmitting and receiving device) of the present disclosure is a transmitting and receiving device that performs bidirectional signal transmission to and from the other side transmitting and receiving device (second transmitting and receiving device). The transmitting and receiving device includes (1) a driver that causes a current signal to be input into a laser diode based on a signal to be transmitted to the other side transmitting and receiving device and causes an optical signal to be output from the laser diode to the other-side photodiode on the other side transmitting and receiving device side. The transmitting and receiving device includes (2) an amplifier that receives a current signal output from a photodiode that receives an optical signal arriving from the other-side laser diode on the other side transmitting and receiving device side, converts the current signal into a voltage signal, and outputs the voltage signal. The transmitting and receiving device includes (3) an average current detector that detects an average value of the current signal output from the photodiode. The transmitting and receiving device includes (4) a controller that controls an input of a current signal from the driver to the laser diode. In addition, the second transmitting and receiving device can have the same configuration as the first transmitting and receiving device.

In a non-signal period in which there is no signal to be transmitted and received to and from the other side transmitting and receiving device, the controller (a) causes a current signal to be input from the driver to the laser diode, causes an optical signal to be output from the laser diode, and when an optical signal of a specific pattern output from the other-side laser diode over a period reaches the photodiode, a length of the period depending on an average value of a current signal output from the other-side photodiode that receives the optical signal from the laser diode, the controller adjusts a magnitude of the current signal input from the driver to the laser diode based on the length of the period of the optical signal of the specific pattern. Over a period of length that depends on the average value of the current signal detected by the average current detector, the controller (b) can also cause a current signal of a specific pattern to be input from the driver to the laser diode and cause an optical signal of a specific pattern to be output from the laser diode.

It is preferable that the optical signal of the specific pattern has a power that repeats increasing and decreasing with respect to power before and after a period of the specific pattern, and it is preferable that the optical signal of the specific pattern has a power different from power before and after a period of the specific pattern.

A terminal device of the present disclosure includes: the above-described transmitting and receiving device (first transmitting and receiving device); the above-described laser diode that receives a current signal from the driver of the transmitting and receiving device and outputs an optical signal; and the above-described photodiode that receives the optical signal and outputs a current signal to the amplifier of the transmitting and receiving device.

A transmitting and receiving system of the present disclosure includes a first terminal device and a second terminal device each of which is the above-described terminal device. The optical signal output from the laser diode of the first terminal device is received by the photodiode of the second terminal device, and the optical signal output from the laser diode of the second terminal device is received by the photodiode of the first terminal device. It is preferable that the transmitting and receiving system further includes: a first optical fiber that guides the optical signal output from the laser diode of the first terminal device to the photodiode of the second terminal device; and a second optical fiber that guides the optical signal output from the laser diode of the second terminal device to the photodiode of the first terminal device.

According to the transmitting and receiving device, since it is possible to perform bidirectional communication by transmitting the optical signal output from the laser diode, the magnitude of the current signal supplied to the laser diode can be adjusted with high accuracy using an inexpensive configuration.

BRIEF DESCRIPTION OF THE DRAWINGS

FIG. 7A, FIG. 7B, FIG. 7C and FIG. 7D are timing charts showing an operation example of the transmitting and receiving system when individual adjustment is performed using a first pattern as a specific pattern in a non-signal period.

FIG. 8A, FIG. 8B, FIG. 8C and FIG. 8D are timing charts showing an operation example of the transmitting and receiving system when individual adjustment is performed using a second pattern as a specific pattern in a non-signal period.

FIG. 9A, FIG. 9B, FIG. 9C and FIG. 9D are timing charts showing an operation example of the transmitting and receiving system when simultaneous adjustment is performed using a first pattern as a specific pattern in a non-signal period.

FIG. 10A, FIG. 10B, FIG. 10C and FIG. 10D are timing charts showing an operation example of the transmitting and receiving system when simultaneous adjustment is performed using a second pattern as a specific pattern in a non-signal period.

DETAILED DESCRIPTION

Figure 1:
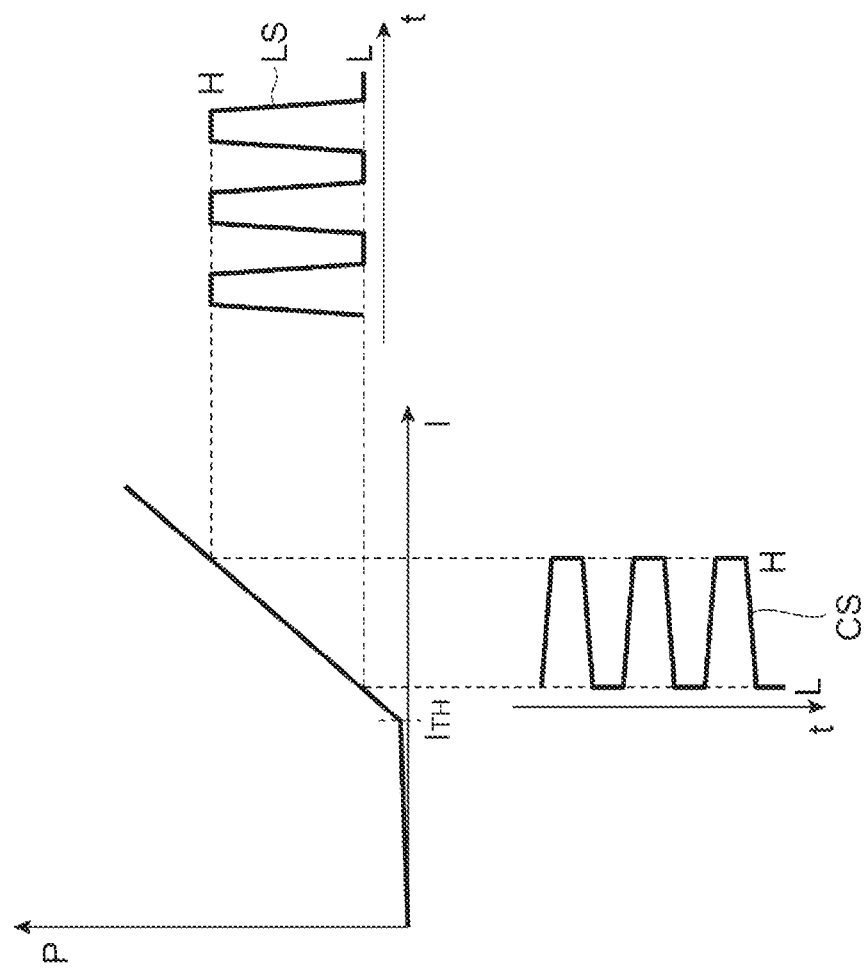
FIG. 1 is a diagram showing the relationship between output light power and a supply current value in a laser diode.
Figure 2:
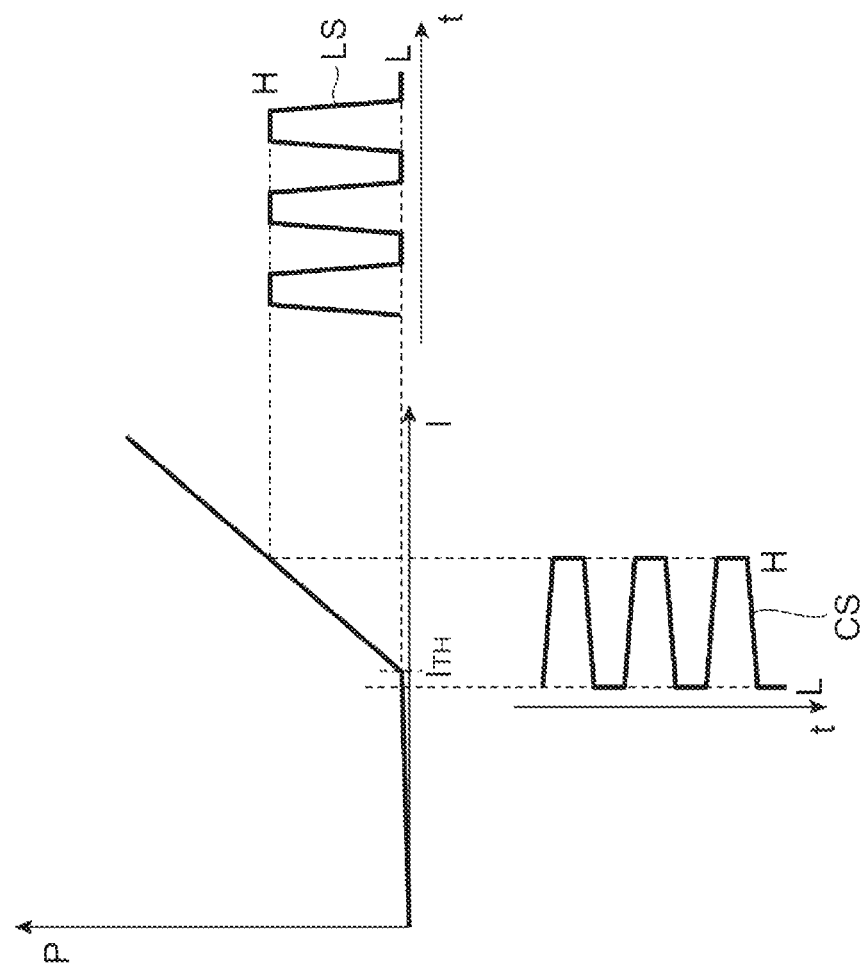
FIG. 2 is a diagram showing the relationship between output light power and a supply current value in a laser diode.

Hereinafter, embodiments for carrying out the invention will be described in detail with reference to the accompanying diagrams. In addition, in the description of the diagrams, the same elements are denoted by the same reference numerals, and the repeated description thereof will be omitted. The invention is not limited to these examples, but is defined by the claims, and is intended to include all modifications within the meaning and scope equivalent to the claims.

Figure 3:
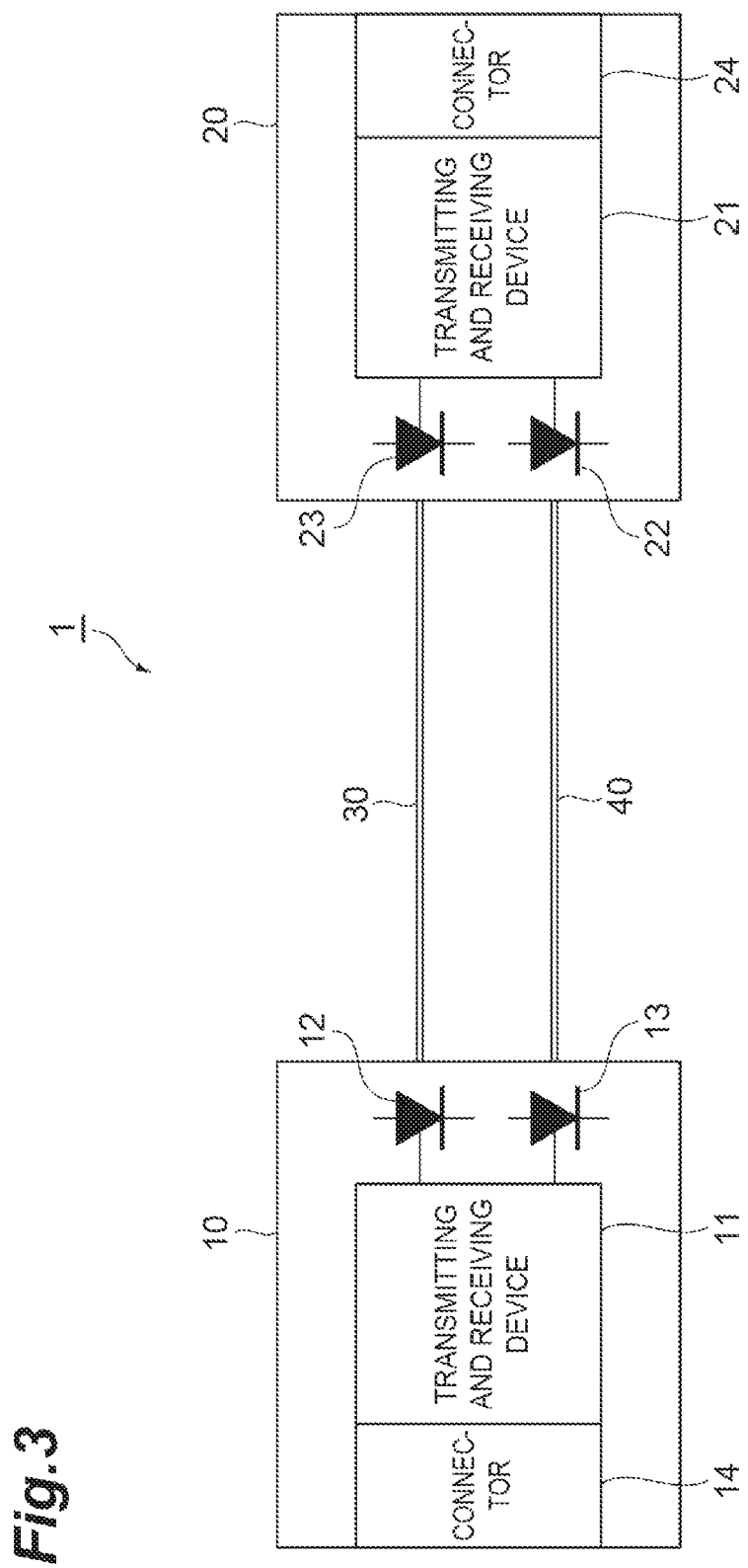
FIG. 3 is a diagram showing the configuration of a transmitting and receiving system.

FIG. 3 is a diagram showing the configuration of a transmitting and receiving system 1. The transmitting and receiving system 1 includes a terminal device 10 and a terminal device 20. The terminal device 10 includes a transmitting and receiving device 11, a laser diode 12, and a photodiode 13. The terminal device 20 includes a transmitting and receiving device 21, a laser diode 22, and a photodiode 23. The terminal device 10 and the terminal device 20 can have the same configuration.

The optical signal output from the laser diode 12 of the terminal device 10 is received by the photodiode 23 of the terminal device 20. The optical signal output from the laser diode 22 of the terminal device 20 is received by the photodiode 13 of the terminal device 10. The optical signal output from the laser diode 12 may propagate in space and reach the photodiode 23, but it is preferable that the optical signal output from the laser diode 12 is guided by an optical fiber 30 to reach the photodiode 23. Similarly, the optical signal output from the laser diode 22 may propagate in space and reach the photodiode 13, but it is preferable that the optical signal output from the laser diode 22 is guided by an optical fiber 40 to reach the photodiode 13. By guiding the optical signal with the optical fiber, long-distance optical transmission with low loss is possible.

In addition, the terminal device 10 includes a connector 14, and the terminal device 20 includes a connector 24. The transmitting and receiving device 11 of the terminal device 10 supplies a current signal to the laser diode 12 based on a voltage signal input into the connector 14, an optical signal is output from the laser diode 12, a current signal output from the photodiode 13 that receives the optical signal is converted into a voltage signal, and the voltage signal is output from the connector 14. Similarly, the transmitting and receiving device 21 of the terminal device 20 supplies a current signal to the laser diode 22 based on a voltage signal input into the connector 24, an optical signal is output from the laser diode 22, a current signal output from the photodiode 23 that receives the optical signal is converted into a voltage signal, and the voltage signal is output from the connector 24.

An active optical cable (AOC) has such a configuration. In the AOC, a transmitting and receiving device, a laser diode, and a photodiode are mounted on a substrate called a paddle card. Then, the transmitting and receiving device and the connector are electrically connected to each other, the laser diode and the light incidence end of one optical fiber are optically connected to each other, and the photodiode and the light emitting end of the other optical fiber are optically connected to each other.

Figure 4:
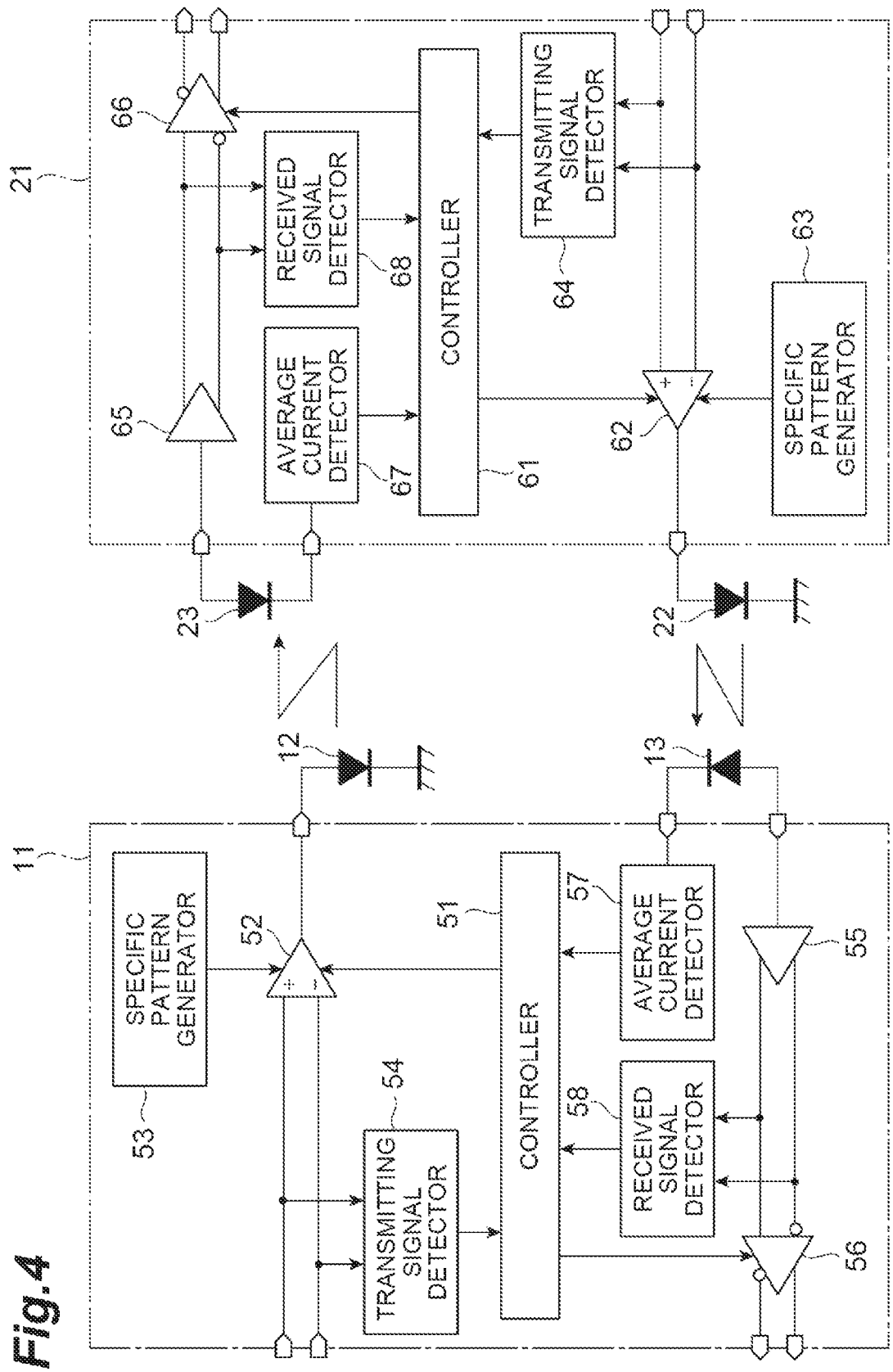
FIG. 4 is a diagram showing the configurations of a transmitting and receiving device and the other side transmitting and receiving device.

FIG. 4 is a diagram showing the configurations of the transmitting and receiving device 11 and the transmitting and receiving device 21. In this diagram, the laser diode 12 and the photodiode 13 on the transmitting and receiving device 11 side are shown, and the laser diode 22 and the photodiode 23 on the transmitting and receiving device 21 side are also shown.

The transmitting and receiving device 11 includes a controller 51, a driver 52, a specific pattern generator 53, a transmitting signal detector 54, an amplifier 55, a differential amplifier 56 (differential amplifying unit), an average current detector 57, and a received signal detector 58. The transmitting and receiving device 21 includes a controller 61, a driver 62, a specific pattern generator 63, a transmitting signal detector 64, an amplifier 65, a differential amplifier 66 (differential amplifying unit), an average current detector 67, and a received signal detector 68. The transmitting and receiving device 11 and the transmitting and receiving device 21 have the same configuration, and components having the same names between the transmitting and receiving device 11 and the transmitting and receiving device 21 have the same functions.

Hereinafter, the configuration of one of the transmitting and receiving device 11 and the transmitting and receiving device 21 will be mainly described. The transmitting and receiving device 11 performs bidirectional signal transmission to and from the other side transmitting and receiving device 21. The controller 51 controls the operations of the driver 52 and the differential amplifier 56 according to the detection results of the transmitting signal detector 54, the average current detector 57, and the received signal detector 58.

When there is a signal to be transmitted to the other side transmitting and receiving device 21, the driver 52 inputs a current signal to the laser diode 12 based on the signal, and an optical signal is output from the laser diode 12 to the other-side photodiode 23. The signal (voltage signal) input into the driver 52 may be a differential signal. In addition, in a non-signal period in which there is no signal to be transmitted and received to and from the other side transmitting and receiving device 21, the driver 52 inputs a current signal of a specific pattern generated by the specific pattern generator 53 to the laser diode 12, and the optical signal of the specific pattern is output from the laser diode 12 to the other-side photodiode 23.

The specific pattern generator 53 generates a specific pattern of the current signal to be supplied to the laser diode 12 by the driver 52 in the non-signal period. The transmitting signal detector 54 detects the presence or absence of a signal to be transmitted to the other side transmitting and receiving device 21, and notifies the controller 51 of the detection result. The transmitting signal detector 54 can detect the presence or absence of a signal to be transmitted based on the magnitude of the temporal change in the level of the signal (voltage signal) input into the driver 52.

The amplifier 55 inputs a current signal output from the photodiode 13 that receives the optical signal arriving from the other-side laser diode 22, converts the current signal into a voltage signal, and outputs the voltage signal. The amplifier 55 is a TIA that converts a current signal into a voltage signal. The voltage signal output from the amplifier 55 may be a differential signal. The differential amplifier 56 amplifies and outputs the signal output from the amplifier 55. The differential amplifier 56 can put the output end in a high impedance state by the control of the controller 51 during the non-signal period in which no signal is transmitted from the other side transmitting and receiving device 21.

The average current detector 57 detects an average value of the current signal output from the photodiode 13, and notifies the controller 51 of the detection result. When the value of the current signal output from the photodiode 13 changes with time, the average current detector 57 calculates a moving average (low frequency component) by smoothing the current signal that changes with time. The received signal detector 58 monitors the voltage signal output from the amplifier 55, detects the level of the voltage signal, and notifies the controller 51 of the detection result.

The controller 51 receives the detection results of the transmitting signal detector 54, the average current detector 57, and the received signal detector 58. Based on these detection results, the controller 51 determines whether or not there is a signal to be transmitted from the transmitting and receiving device 11 to the other side transmitting and receiving device 21, and also determines whether or not there is a signal to be transmitted from the other side transmitting and receiving device 21 to the transmitting and receiving device 11. As a result, the controller 51 can detect a non-signal period in which there is no signal to be transmitted and received to and from the other side transmitting and receiving device 21. In the detected non-signal period, the controller 51 puts the output of the differential amplifier 56 in a high impedance state.

In the non-signal period, the controller 51 causes a current signal to be input from the driver 52 to the laser diode 12 and causes an optical signal to be output from the laser diode 12. When an optical signal of a specific pattern output from the other-side laser diode 22 over a period reaches the photodiode 13, a length of the period depending on an average value (detection result of the average current detector 67) of a current signal output from the other-side photodiode 23 that receives the optical signal from the laser diode 12, the controller 51 adjusts the magnitude of the current signal input from the driver 52 to the laser diode 12 based on the length of the period of the optical signal of the specific pattern.

In the non-signal period, the controller 51 causes a current signal of a specific pattern to be input from the driver 52 to the laser diode 12 and causes an optical signal of a specific pattern to be output from the laser diode 12 over a period of length that depends on the average value of the current signal detected by the average current detector 57.

The length of the period of the specific pattern may be set to any of multiple stages, but is preferably set to any of two steps based on the comparison between the average value of the current signals detected by the average current detectors 57 and 67 and a threshold value (target value).

Figure 5:
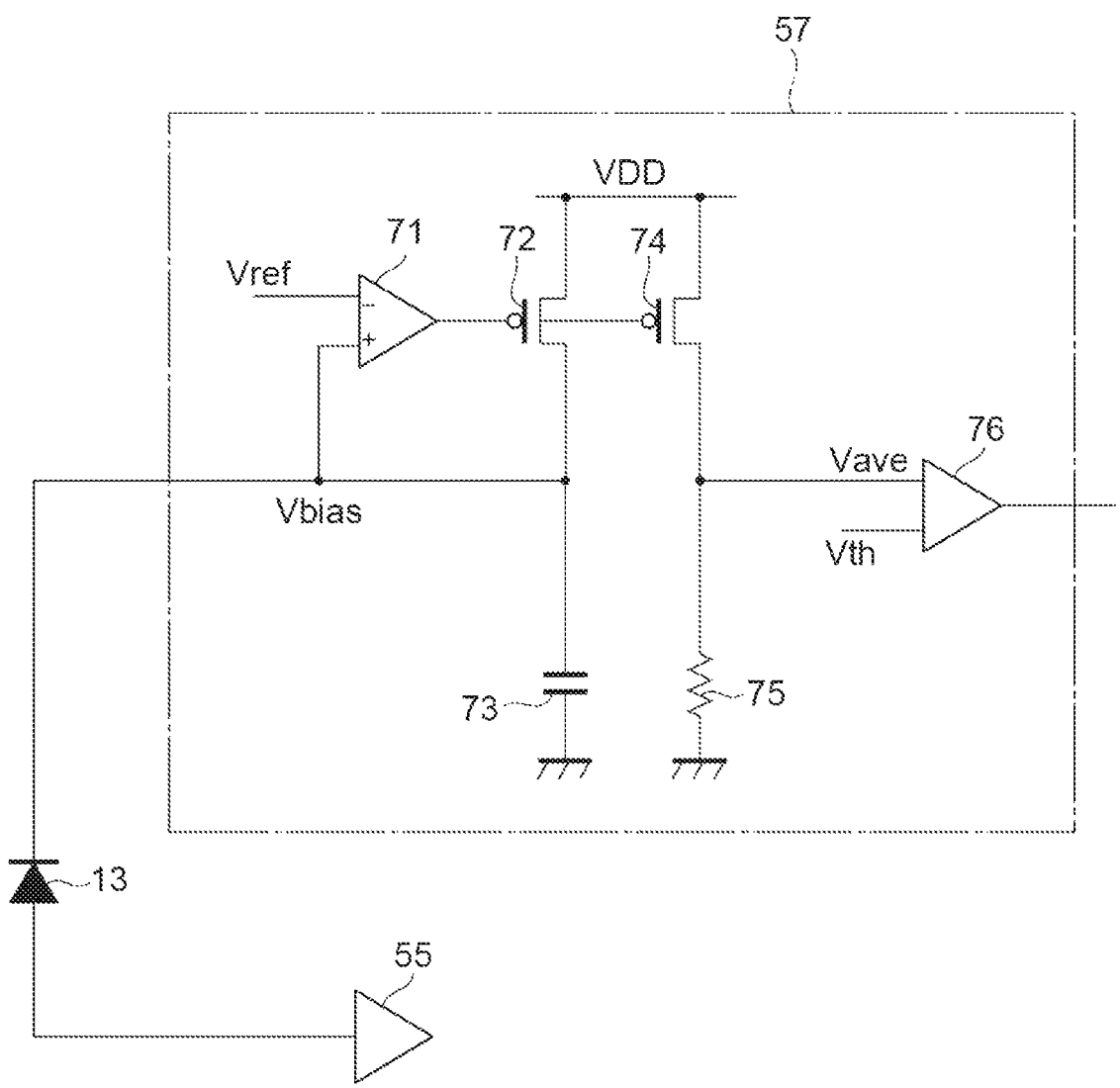
FIG. 5 is a diagram showing a circuit example of an average current detector of the transmitting and receiving device.

FIG. 5 is a diagram showing a circuit example of the average current detector 57 of the transmitting and receiving device 11. In this diagram, the photodiode 13 and the amplifier 55 are also shown. The average current detector 57 includes a differential amplifier 71, a PMOS transistor 72, a capacitor 73, a PMOS transistor 74, a resistor 75, and a comparator 76.

The anode of the photodiode 13 is connected to the input terminal of the amplifier 55. The cathode of the photodiode 13 is connected to the non-inverting input terminal of the differential amplifier 71. A predetermined reference voltage Vref is input to the inverting input terminal of the differential amplifier 71. The output terminal of the differential amplifier 71 is connected to the gate of each of the PMOS transistors 72 and 74. The source of each of the PMOS transistors 72 and 74 is connected to the power potential supply end. The drain of the PMOS transistor 72 is connected to the non-inverting input terminal of the differential amplifier 71, and is also connected to the ground potential supply end through the capacitor 73. The drain of the PMOS transistor 74 is connected to one input terminal of the comparator 76, and is also connected to the ground potential supply end through the resistor 75. A predetermined threshold voltage Vth is input to the other input terminal of the comparator 76. The comparator 76 compares the values of the voltages input to the two input terminals, and outputs a signal indicating the comparison result from the output terminal to the controller 51.

The PMOS transistor 72 serves as a current source. The differential amplifier 71, the PMOS transistor 72, and the capacitor 73 form a low dropout regulator (LDO). A voltage value Vbias at the non-inverting input terminal of the differential amplifier 71 is equal to the predetermined reference voltage Vref input to the inverting input terminal of the differential amplifier 71. The predetermined voltage value Vbias is applied to the cathode of the photodiode 13. In the current signal output from the photodiode 13, an AC component (high frequency component) flows through the capacitor 73, and an average current (low frequency component) flows between the source and drain of the PMOS transistor 72.

The PMOS transistors 72 and 74 form a current mirror. One terminal of the PMOS transistor 72 is connected to a power potential VDD, and the other terminal is connected to the ground potential through the capacitor 73. One terminal of the PMOS transistor 74 is connected to the power potential VDD, and the other terminal is connected to the ground potential through the resistor 75. The magnitude of the current flowing between the source and drain of the PMOS transistor 74 (that is, the current flowing through the resistor 75) is equal to the magnitude of the current flowing between the source and drain of the PMOS transistor 72. The value of the voltage input to one input terminal of the comparator 76 is Vave, which is a product between the magnitude of the current flowing through the resistor 75 and the resistance value of the resistor 75. The comparator 76 compares the voltage value Vave with the threshold voltage Vth, and outputs a signal indicating which of the two voltage values is larger from the output terminal. The signal output from the output terminal of the comparator 76 indicates whether or not the average value (low frequency component) of the current signal output from the photodiode 13 is larger than the target value.

In the present embodiment, the transmitting and receiving device 11 can adjust the magnitude of the current signal supplied to the laser diode 12 by the control of the controller 51 in the non-signal period. Similarly, the transmitting and receiving device 21 can adjust the magnitude of the current signal supplied to the laser diode 22 by the control of the controller 61 in the non-signal period.

Figure 6:
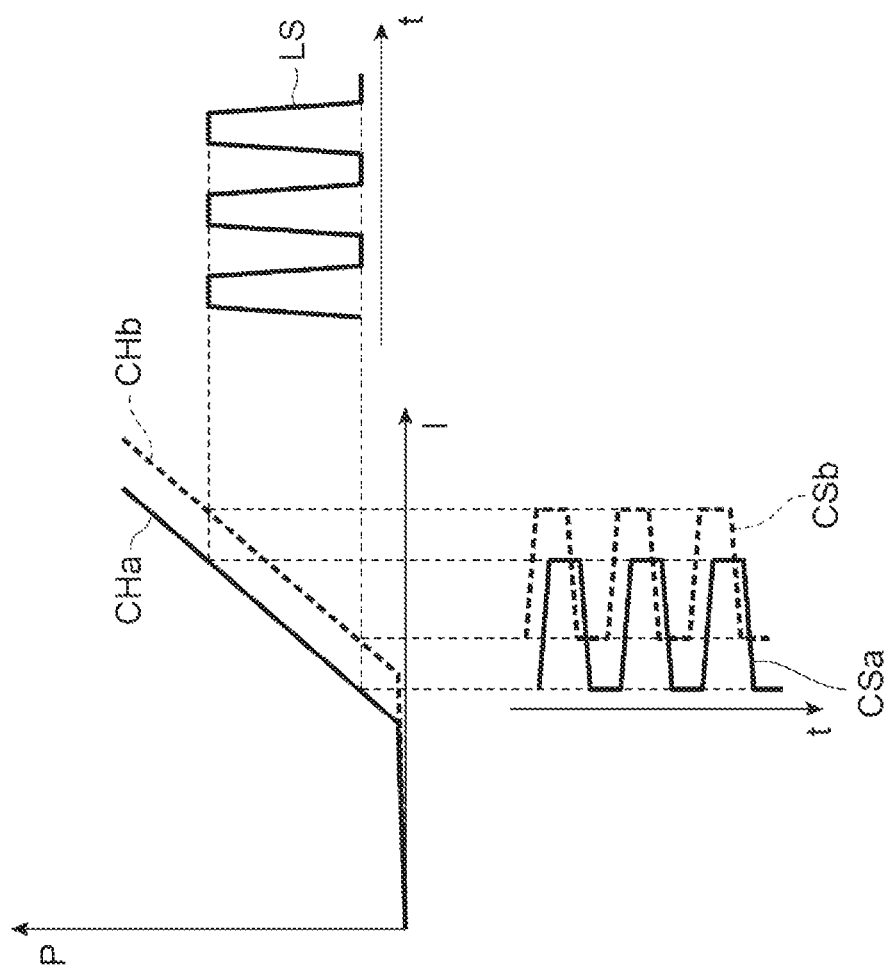
FIG. 6 is a diagram showing the relationship between output light power and a supply current value in a laser diode.

FIG. 6 is a diagram showing the relationship between the output light power P and the supply current value I in the laser diode. FIG. 6 illustrates the adjustment of the magnitude of the current signal supplied from the driver to the laser diode. The supply current value I changes with time t. The output light power P changes with time t. A current signal CSa before the characteristic change is shown by a solid line, and a current signal CSb after the characteristic change is shown by a broken line. A current/output light power characteristic CHa of the optical signal LS before the characteristic change is shown by a solid line, and a current/output light power characteristic CHb of the optical signal LS after the characteristic change is shown by a broken line. It is assumed that the characteristic between the output light power P and the supply current value I in the laser diode changes from the characteristic CHa shown by the solid line to the characteristic CHb shown by the broken line due to temperature change or aging deterioration. When such a characteristic change occurs, the magnitude of the current signal supplied from the driver to the laser diode is changed from the current signal CSa shown by the solid line to the current signal CSb shown by the broken line so that the change in the magnitude of the optical signal LS output from the laser diode is suppressed.

Since the present embodiment is based on feedback control, the magnitude of the current signal supplied to the laser diode can be adjusted with high accuracy. In addition, in the present embodiment, it is not necessary to use an expensive laser diode around which a monitoring photodiode is disposed unlike the device disclosed in Patent Document 2, and it is not necessary to provide a copper wire separately from the optical fiber unlike the device disclosed in Patent Document 3. Therefore, the configuration can be inexpensive.

Next, an operation example of the transmitting and receiving system 1 will be described. When there is a signal to be transmitted from the transmitting and receiving device 11 to the other side transmitting and receiving device 21, a current signal corresponding to the signal (voltage signal) is applied from the driver 52 to the laser diode 12, and an optical signal corresponding to the current signal is output from the laser diode 12. When the optical signal output from the laser diode 12 reaches the other-side photodiode 23, a current signal corresponding to the optical signal is output from the photodiode 23, the current signal is converted into a voltage signal by the amplifier 65, and the voltage signal is amplified and output by the differential amplifier 66 (differential amplifying unit). The same applies when there is a signal to be transmitted from the transmitting and receiving device 21 to the transmitting and receiving device 11.

The non-signal period in which there is no signal to be transmitted from either the transmitting and receiving device 11 or the transmitting and receiving device 21 can be detected as follows. When there is no signal to be transmitted from the transmitting and receiving device 11 to the transmitting and receiving device 21, the fact is detected by the transmitting signal detector 54, and the controller 51 is notified of the detection result. Then, by the control of the controller 51, no current is supplied from the driver 52 to the laser diode 12, so that the light is not output from the laser diode 12. In the transmitting and receiving device 21, the average current detector 67 detects that there is no light reaching the photodiode 23 from the laser diode 12, and the controller 61 is notified of the detection result. Similarly, when there is no signal to be transmitted from the transmitting and receiving device 21 to the transmitting and receiving device 11, the fact is detected by the transmitting signal detector 64, and the controller 61 is notified of the detection result. Then, by the control by the controller 61, no current is supplied from the driver 62 to the laser diode 22, so that the light is not output from the laser diode 22. In the transmitting and receiving device 11, the average current detector 57 detects that there is no light reaching the photodiode 13 from the laser diode 22, and the controller 51 is notified of the detection result. In this manner, the controller 51 of the transmitting and receiving device 11 and the controller 61 of the transmitting and receiving device 21 can detect a non-signal period in which there is no signal to be transmitted and received between the transmitting and receiving device 11 and the transmitting and receiving device 21.

The non-signal period is present not only between a normal communication period (period in which the original signal is to be transmitted) and the next normal communication period but also at the time of startup. In all of the cases, the magnitude of the current signal input from the driver 52 to the laser diode 12 can be adjusted. By performing the adjustment in the non-signal period at the time of startup, the magnitude of the current signal input into the laser diode 12 can be optimized even if the characteristics of the laser diode 12 change due to aging deterioration at that time. By performing the adjustment in the non-signal period between the normal communication period and the normal communication period, the magnitude of the current signal input into the laser diode 12 can be optimally maintained even if the characteristics of the laser diode 12 change due to a temperature change during operation.

In the non-signal period, the magnitude of the current signal supplied from the driver 52 to the laser diode 12 on the transmitting and receiving device 11 side and the magnitude of the current signal supplied from the driver 62 to the laser diode 22 on the transmitting and receiving device 21 side may be individually adjusted or may be adjusted substantially simultaneously.

Various specific patterns are possible. Any specific pattern may be used as long as the period of the specific pattern in the non-signal period can be distinguished from other periods. The optical signal of a specific pattern may be an optical signal whose power repeats increasing and decreasing with respect to the power before and after the period of the specific pattern (hereinafter, referred to as a "first pattern"). In addition, the optical signal of a specific pattern may be a signal having a power different from the power before and after the period of the specific pattern (hereinafter referred to as a "second pattern").

Next, an operation example of the transmitting and receiving system 1 in the non-signal period will be described with reference to FIGS. 7A to 10D. This operation is performed under the control of the controllers 51 and 61. In the case of individual adjustment, the adjustment of the magnitude of the current signal supplied from the driver 52 to the laser diode 12 on the transmitting and receiving device 11 side and the adjustment of the current signal supplied from the driver 62 to the laser diode 22 on the transmitting and receiving device 21 side can be similarly performed. Therefore, in the following description of the operation example of the individual adjustment, the adjustment of the magnitude of the current signal supplied from the driver 52 to the laser diode 12 on the transmitting and receiving device 11 side will be mainly described.

FIGS. 7A to 7D are timing charts showing an operation example of the transmitting and receiving system 1 when individual adjustment is performed using the first pattern as a specific pattern in the non-signal period. FIG. 7A shows a timing chart of the optical signal output from the laser diode 12 on the transmitting and receiving device 11 side. FIG. 7B shows an average timing chart of the current signal output from the photodiode 23 on the transmitting and receiving device 21 side. FIG. 7C shows a timing chart of the optical signal output from the laser diode 22 on the transmitting and receiving device 21 side. FIG. 7D shows a timing chart of the voltage signal output from the amplifier 55 on the transmitting and receiving device 11 side. In these timing charts, the waveform of each signal is schematically shown.

In a first cycle P1, on the transmitting and receiving device 11 side, an optical signal which has a predetermined amplitude and whose power repeats increasing and decreasing is output from the laser diode 12 corresponding to the current signal input from the driver 52 to the laser diode 12 (FIG. 7A). The target value of the amplitude center (average value) of the optical signal output from the laser diode 12 is a target value TGa.

The optical signal output from the laser diode 12 is received by the photodiode 23 on the transmitting and receiving device 21 side, and the average value ($Iave_{(23)}$) (FIG. 7B) of the current signal output from the photodiode 23 is compared with a target value TGb by the average current detector 67. In the example shown in the diagram, the average value ($Iave_{(23)}$) (FIG. 7B) of the current signal output from the photodiode 23 is larger than the target value TGb (TGb<$Iave_{(23)}$). Over a period T1 that depends on this result, the current signal of the specific pattern is input from the driver 62 to the laser diode 22 and the optical signal of the specific pattern is output from the laser diode 22 (FIG. 7C). The period T1 has information that the laser light output is too large. The power of the optical signal in a period other than the period T1 is equal to the average power of the optical signal in the period T1.

The optical signal output from the laser diode 22 is received by the photodiode 13 on the transmitting and receiving device 11 side, and the current signal output from the photodiode 13 is converted into a voltage signal by the amplifier 55 (FIG. 7D). When the voltage signal output from the amplifier 55 is a differential signal, the received signal detector 58 detects the presence or absence of the amplitude of the differential signal, so that the length of the period T1 of the specific pattern is detected. Based on the length of the period T1 of the specific pattern of the voltage signal (FIG. 7D) output from the amplifier 55, the magnitude of the current signal input from the driver 52 to the laser diode 12 in the next second cycle P2 is changed. In the example shown in this diagram, in the first cycle P1, the average value ($Iave_{(23)}$) (FIG. 7B) of the current signal output from the photodiode 23 is determined to be larger than the target value TGb (TGb<$Iave_{(23)}$). Therefore, in the next second cycle P2, the magnitude of the current signal input from the driver 52 to the laser diode 12 is made smaller than the magnitude of the current signal in the case of the first cycle P1. When the period T1 indicates information that the laser light output is too large, the gain or offset potential of the driver 52 is reduced. The controller 51 can be connected to the gain adjustment terminal or the offset adjustment terminal of the driver 52.

In the second cycle P2, on the transmitting and receiving device 11 side, an optical signal which has a predetermined amplitude and whose power repeats increasing and decreasing is output from the laser diode 12 corresponding to the changed current signal (smaller than the current signal in the first cycle P1 before the change) input from the driver 52 to the laser diode 12 (FIG. 7A).

The optical signal output from the laser diode 12 is received by the photodiode 23 on the transmitting and receiving device 21 side, and the average value ($Iave_{(23)}$) (FIG. 7B) of the current signal output from the photodiode 23 is compared with the target value TGb by the average current detector 67. In the example shown in the diagram, the average value ($Iave_{(23)}$) (FIG. 7B) of the current signal output from the photodiode 23 is smaller than the target value TGb ($Iave_{(23)}$<TGb). Over a period T2 that depends on this result, the current signal of the specific pattern is input from the driver 62 to the laser diode 22 and the optical signal of the specific pattern is output from the laser diode 22 (FIG. 7C). The power of the optical signal in a period other than the period T2 is equal to the average power of the optical signal in the period T2. When the period T2 indicates information that the laser light output is too small, the gain or offset potential of the driver 52 is increased. The controller 51 can be connected to the gain adjustment terminal or the offset adjustment terminal of the driver 52.

The optical signal output from the laser diode 22 is received by the photodiode 13 on the transmitting and receiving device 11 side, and the current signal output from the photodiode 13 is converted into a voltage signal by the amplifier 55 (FIG. 7D). When the voltage signal output from the amplifier 55 is a differential signal, the received signal detector 58 detects the presence or absence of the amplitude of the differential signal, so that the length of the period T2 of the specific pattern is detected. Based on the length of the period T2 of the specific pattern of the voltage signal (FIG. 7D) output from the amplifier 55, the magnitude of the current signal input from the driver 52 to the laser diode 12 in the next third cycle is changed. In the example shown in this diagram, in the second cycle P2, the average value ($Iave_{(23)}$) (FIG. 7B) of the current signal output from the photodiode 23 is determined to be smaller than the target value TGb ($Iave_{(23)}$<TGb). Therefore, in the next third cycle, the magnitude of the current signal input from the driver 52 to the laser diode 12 is made larger than the magnitude of the current signal in the case of the second cycle P2. In addition, the amount of change in the input current can be made constant in each cycle, but can be made to decrease as movement to the later cycle is made.

FIGS. 8A to 8D are timing charts showing an operation example of the transmitting and receiving system 1 when individual adjustment is performed using the second pattern as a specific pattern in the non-signal period. FIG. 8A shows a timing chart of the optical signal output from the laser diode 12 on the transmitting and receiving device 11 side. FIG. 8B shows an average timing chart of the current signal output from the photodiode 23 on the transmitting and receiving device 21 side. FIG. 8C shows a timing chart of the optical signal output from the laser diode 22 on the transmitting and receiving device 21 side. FIG. 8D shows an average timing chart of the current signal output from the photodiode 13 on the transmitting and receiving device 11 side. In these timing charts, the waveform of each signal is schematically shown.

In a first cycle P1, on the transmitting and receiving device 11 side, an optical signal, which is an optical signal corresponding to the current signal input from the driver 52 to the laser diode 12 and which has a constant amplitude and whose power repeats increasing and decreasing, is output from the laser diode 12 (FIG. 8A). The target value of the amplitude center (average value) of the optical signal output from the laser diode 12 is a target value TGa.

The optical signal output from the laser diode 12 is received by the photodiode 23 on the transmitting and receiving device 21 side, and the average value (=Iave$_{(23)}$) (FIG. 8B) of the current signal output from the photodiode 23 is compared with a target value TGb by the average current detector 67. In the example shown in the diagram, the average value (Iave$_{(23)}$) (FIG. 8B) of the current signal output from the photodiode 23 is larger than the target value TGb (TGb<Iave$_{(23)}$). Over a period T1 that depends on this result, the current signal of the specific pattern is input from the driver 62 to the laser diode 22 and the optical signal of the specific pattern is output from the laser diode 22 (FIG. 8C). The power of the optical signal in a period other than the period T1 is set to a value (for example, a smaller value or an off state) different from the average power of the optical signal in the period T1.

The optical signal output from the laser diode 22 is received by the photodiode 13 on the transmitting and receiving device 11 side, and the average value (FIG. 8D) of the current signal output from the photodiode 13 is detected by the average current detector 57. As a result, the length of the period T1 of the specific pattern is detected. Based on the length of the period T1 of the specific pattern, the magnitude of the current signal input from the driver 52 to the laser diode 12 in the next second cycle P2 is changed. In the example shown in this diagram, in the first cycle P1, the average value (Iave$_{(23)}$) (FIG. 8B) of the current signal output from the photodiode 23 is determined to be larger than the target value TGb (TGb<Iave$_{(23)}$). Therefore, in the next second cycle P2, the magnitude of the current signal input from the driver 52 to the laser diode 12 is made smaller than the magnitude of the current signal in the case of the first cycle P1.

In a second cycle P2, on the transmitting and receiving device 11 side, an optical signal, which is an optical signal corresponding to the current signal input from the driver 52 to the laser diode 12 and which has a constant amplitude and whose power repeats increasing and decreasing, is output from the laser diode 12 (FIG. 8A).

The optical signal output from the laser diode 12 is received by the photodiode 23 on the transmitting and receiving device 21 side, and the average value (Iave$_{(23)}$) (FIG. 8B) of the current signal output from the photodiode 23 is compared with the target value TGb by the average current detector 67. In the example shown in the diagram, the average value (Iave$_{(23)}$) (FIG. 8B) of the current signal output from the photodiode 23 is smaller than the target value TGb (Iave$_{(23)}$<TGb). Over a period T2 that depends on this result, the current signal of the specific pattern is input from the driver 62 to the laser diode 22 and the optical signal of the specific pattern is output from the laser diode 22 (FIG. 8C). The power of the optical signal in a period other than the period T2 is set to a value (for example, a smaller value or an off state) different from the average power of the optical signal in the period T2.

The optical signal output from the laser diode 22 is received by the photodiode 13 on the transmitting and receiving device 11 side, and the average value (FIG. 8D) of the current signal output from the photodiode 13 is detected by the average current detector 57. As a result, the length of the period T2 of the specific pattern is detected. Based on the length of the period T2 of the specific pattern, the magnitude of the current signal input from the driver 52 to the laser diode 12 in the next third cycle is changed. In the example shown in this diagram, in the second cycle P2, the average value (Iave$_{(23)}$) (FIG. 8B) of the current signal output from the photodiode 23 is determined to be smaller than the target value TGb (Iave$_{(23)}$<TGb). Therefore, in the next third cycle, the magnitude of the current signal input from the driver 52 to the laser diode 12 is made larger than the magnitude of the current signal in the case of the second cycle P2.

FIGS. 9A to 9D are timing charts showing an operation example of the transmitting and receiving system 1 when simultaneous adjustment is performed using the first pattern as a specific pattern in the non-signal period. FIG. 9A shows a timing chart of the optical signal output from the laser diode 12 on the transmitting and receiving device 11 side. FIG. 9B shows an average timing chart of the current signal output from the photodiode 23 on the transmitting and receiving device 21 side. FIG. 9C shows a timing chart of the optical signal output from the laser diode 22 on the transmitting and receiving device 21 side. FIG. 9D shows an average timing chart of the current signal output from the photodiode 13 on the transmitting and receiving device 11 side. In these timing charts, the waveform of each signal is schematically shown.

In a first cycle P1, the optical signal (FIG. 9A) output from the laser diode 12 is received by the photodiode 23 on the transmitting and receiving device 21 side. The target value of the amplitude center (average value) of the optical signal output from the laser diode 12 is a target value TGa. The average value (Iave$_{(23)}$) (FIG. 9B) of the current signal output from the photodiode 23 is compared with a target value TGb by the average current detector 67. In the example shown in the diagram, the average value (Iave$_{(23)}$) (FIG. 9B) of the current signal output from the photodiode 23 during the specific pattern output period is larger than the target value TGb (TGb<Iave$_{(23)}$). Over a period T1 that depends on this result, the current signal of the specific pattern is input from the driver 62 to the laser diode 22 and the optical signal of the specific pattern is output from the laser diode 22 (FIG. 9C). The target value of the amplitude center (average value) of the optical signal output from the laser diode 22 is a target value TGc.

The optical signal (FIG. 9C) output from the laser diode 22 is received by the photodiode 13 on the transmitting and receiving device 11 side, and the average value (Iave$_{(13)}$) (FIG. 9D) of the current signal output from the photodiode 13 is compared with a target value TGd by the average current detector 57. In the example shown in the diagram, the average value (Iave$_{(13)}$) (FIG. 9D) of the current signal output from the photodiode 13 during the specific pattern output period is smaller than the target value TGd (Iave$_{(13)}$<TGd). Over a period T1 that depends on this result, the current signal of the specific pattern is input from the driver 52 to the laser diode 12 and the optical signal of the specific pattern is output from the laser diode 12 (FIG. 9A).

Based on the length (optical signal output excess information) of the period T1 of the specific pattern of the optical signal (FIG. 9C) received by the photodiode 13 in the first cycle P1, the magnitude of the current signal input from the driver 52 to the laser diode 12 in the next second cycle P2 is made smaller than the magnitude of the current signal in the case of the first cycle P1. In addition, based on the length of the period T2 of the specific pattern of the optical signal (FIG. 9A) received by the photodiode 23 in the first cycle P1, the magnitude of the current signal input from the driver 62 to the laser diode 22 in the next second cycle P2 is made larger than the magnitude of the current signal in the case of the first cycle P1 (FIG. 9C).

In the second cycle P2, the optical signal (FIG. 9A) output from the laser diode 12 is received by the photodiode 23 on the transmitting and receiving device 21 side, and the average value ($Iave_{(23)}$) (FIG. 9B) of the current signal output from the photodiode 23 is compared with the target value TGb by the average current detector 67. In the example shown in the diagram, the average value ($Iave_{(13)}$) (FIG. 9B) of the current signal output from the photodiode 23 during the specific pattern output period is smaller than the target value TGb ($Iave_{(13)}$<TGb). Over the period T2 (optical signal output shortage information) that depends on this result, the current signal of the specific pattern is input from the driver 62 to the laser diode 22 and the optical signal of the specific pattern is output from the laser diode 22 (FIG. 9C).

The optical signal (FIG. 9C) output from the laser diode 22 is received by the photodiode 13 on the transmitting and receiving device 11 side, and the average value ($Iave_{(13)}$) (FIG. 9D) of the current signal output from the photodiode 13 is compared with the target value TGd by the average current detector 57. In the example shown in the diagram, the average value ($Iave_{(13)}$) (FIG. 9D) of the current signal output from the photodiode 13 during the specific pattern output period is larger than the target value TGd (TGd<$Iave_{(13)}$). Over the period T1 that depends on this result, the current signal of the specific pattern is input from the driver 52 to the laser diode 12 and the optical signal of the specific pattern is output from the laser diode 12 (FIG. 9A).

Based on the length of the period T2 of the specific pattern of the optical signal (FIG. 9C) received by the photodiode 13 in the second cycle P2, the magnitude of the current signal input from the driver 52 to the laser diode 12 in the next third cycle is made larger than the magnitude of the current signal in the case of the second cycle P2. In addition, based on the length of the period T1 of the specific pattern of the optical signal received by the photodiode 23 (optical signal output from the laser diode 12) (FIG. 9A) in the second cycle P2, the magnitude of the current signal input from the driver 62 to the laser diode 22 in the next third cycle is made smaller than the magnitude of the current signal in the case of the second cycle P2.

FIGS. 10A to 10D are timing charts showing an operation example of the transmitting and receiving system 1 when simultaneous adjustment is performed using the second pattern as a specific pattern in the non-signal period. FIG. 10A shows a timing chart of the optical signal output from the laser diode 12 on the transmitting and receiving device 11 side. FIG. 10B shows an average timing chart of the current signal output from the photodiode 23 on the transmitting and receiving device 21 side. FIG. 10C shows a timing chart of the optical signal output from the laser diode 22 on the transmitting and receiving device 21 side. FIG. 10D shows an average timing chart of the current signal output from the photodiode 13 on the transmitting and receiving device 11 side. In these timing charts, the waveform of each signal is schematically shown.

In a first cycle P1, the optical signal (FIG. 10A) output from the laser diode 12 is received by the photodiode 23 on the transmitting and receiving device 21 side, and the average value ($Iave_{(23)}$) (FIG. 10B) of the current signal output from the photodiode 23 is compared with a target value TGb by the average current detector 67. The target value of the amplitude center of the optical signal pulse output from the laser diode 12 is a target value TGa. In the example shown in the diagram, the average value ($Iave_{(23)}$) (FIG. 10B) of the current signal output from the photodiode 23 during the specific pattern output period is larger than the target value TGb (TGb<$Iave_{(23)}$). Over a period T1 (optical signal output excess information) that depends on this result, the current signal of the specific pattern is input from the driver 62 to the laser diode 22 and the optical signal of the specific pattern is output from the laser diode 22 (FIG. 10C). The target value of the amplitude center of the optical signal pulse output from the laser diode 22 is a target value TGc.

The optical signal (FIG. 10C) output from the laser diode 22 is received by the photodiode 13 on the transmitting and receiving device 11 side, and the average value ($Iave_{(13)}$) (FIG. 10D) of the current signal output from the photodiode 13 is compared with a target value TGd by the average current detector 57. In the example shown in the diagram, the average value ($Iave_{(13)}$) (FIG. 10D) of the current signal output from the photodiode 13 during the specific pattern output period is smaller than the target value TGd ($Iave_{(13)}$<TGd). According to this result (optical signal output excess information), in the period T2 of the next second cycle P2, the current signal of the specific pattern is input from the driver 52 to the laser diode 12 and the optical signal of the specific pattern is output from the laser diode 12 (FIG. 10A).

Based on the length of the period T1 of the specific pattern of the optical signal (FIG. 10C) received by the photodiode 13 in the first cycle P1, the magnitude of the current signal input from the driver 52 to the laser diode 12 in the next second cycle P2 is made smaller than that in the first cycle P1. In addition, based on the length of the period T2 of the specific pattern of the optical signal (FIG. 10A) received by the photodiode 23 in the first cycle P1, the magnitude of the current signal input from the driver 62 to the laser diode 22 in the next second cycle P2 is made larger than the magnitude of the current signal in the case of the first cycle P1 (FIG. 10C).

In the second cycle P2, the optical signal (FIG. 10A) output from the laser diode 12 is received by the photodiode 23 on the transmitting and receiving device 21 side, and the average value ($Iave_{(23)}$) (FIG. 10B) of the current signal output from the photodiode 23 is compared with the target value TGb by the average current detector 67. In the example shown in the diagram, the average value ($Iave_{(23)}$) (FIG. 10B) of the current signal output from the photodiode 23 during the specific pattern output period is smaller than the target value TGb ($Iave_{(23)}$<TGb). Over the period T2 (optical signal output shortage information) that depends on this result, the current signal of the specific pattern is input from the driver 62 to the laser diode 22 and the optical signal of the specific pattern is output from the laser diode 22 (FIG. 10C).

The optical signal (FIG. 10C) output from the laser diode 22 is received by the photodiode 13 on the transmitting and receiving device 11 side, and the average value ($Iave_{(13)}$) (FIG. 10D) of the current signal output from the photodiode 13 is compared with the target value TGd by the average current detector 57. In the example shown in the diagram, the average value ($Iave_{(13)}$) (FIG. 10D) of the current signal output from the photodiode 13 during the specific pattern output period is larger than the target value TGd (TGd<$Iave_{(13)}$). According to this result, in the period T1 of the next third cycle, the current signal of the specific pattern is input from the driver 52 to the laser diode 12 and the optical signal of the specific pattern is output from the laser diode 12.

Based on the length (optical signal output shortage information) of the period T2 of the specific pattern of the optical signal (FIG. 10C) received by the photodiode 13 in the second cycle P2, the magnitude of the current signal input from the driver 52 to the laser diode 12 in the next third cycle is made larger than the magnitude of the current signal in the case of the second cycle P2. In addition, based on the length of the period T2 of the specific pattern of the optical signal received by the photodiode 23 (optical signal output from the laser diode 12) (FIG. 10A) in the second cycle P2, the magnitude of the current signal input from the driver 62 to the laser diode 22 in the next third cycle is made larger than the magnitude of the current signal in the case of the second cycle P2.

In all of the operation examples shown in FIGS. 7A to 10D, operations in the third and subsequent cycles are similarly performed. The length of the period T1 of the specific pattern in the optical signal output from the laser diode 22 when the average value of the current signal output from the photodiode 23 is larger than the target value is different from the length of the period T2 of the specific pattern when the average value of the current signal is smaller than the target value. That is, the length of the period of the specific pattern in the optical signal output from the laser diode 22 depends on the average value ($Iave_{(23)}$) of the current signal output from the photodiode 23, and depends on the average power of the optical signal output from the laser diode 12. The lengths of the periods T1 and T2 are preferably different from each other by two times or more, and more preferably 10 times or more.

The optical loss in the optical path of the optical signal from the laser diode 12 to the photodiode 23 may be constant. Therefore, the target value to be compared with the average value ($Iave_{(23)}$) of the current signal output from the photodiode 23 can be set to correspond to the target value of the average power of the optical signal output from the laser diode 12. By performing the adjustment described above, the average power of the optical signal output from the laser diode 12 can approach the target value, so that it is possible to appropriately set the magnitude of the current signal applied from the driver 52 to the laser diode 12 based on the signal (voltage signal) that should be originally transmitted.

The adjustment of the magnitude of the current signal supplied from the driver 52 to the laser diode 12 may end after a predetermined number of cycles, or may end when the result of the magnitude comparison between the target value and the average value of the current signal output from the photodiode 23 changes. Similarly, the magnitude of the current signal applied from the driver 62 to the laser diode 22 can be appropriately set.

In the operation examples shown in FIGS. 7A to 7D and 9A to 9D, the optical signal of the specific pattern is the first pattern whose power repeats increasing and decreasing with respect to the power before and after the period of the specific pattern. In this case, since the temporal change in the magnitude of the current signal output from the photodiodes 13 and 23 in the non-signal period is small, the amplifiers 55 and 65 can always perform DC offset cancellation. Therefore, it is possible to quickly start up at the time of transition from the non-signal period to the normal communication period.

In the operation examples shown in FIGS. 8A to 8D and FIGS. 10A to 10D, the optical signal of the specific pattern is the second pattern having a power different from the power before and after the period of the specific pattern. In this case, it is possible to reduce the power consumption in a period other than the specific pattern output period in the non-signal period.

When adjusting the magnitude of the current signal supplied to each of the laser diodes 12 and 22 in the non-signal period, the average current detectors 57 and 67 may detect the average magnitude of the current signals output from the photodiodes 13 and 23, and the received signal detectors 58 and 68 may detect the magnitude of the average amplitude of the differential signals output from the amplifiers 55 and 65. In any case, high speed is not required. Therefore, when adjusting the magnitude of the current signal supplied to each of the laser diodes 12 and 22 in the non-signal period, jitter that occurs when performing high-speed communication in the normal communication period does not become a problem.

As described above, the first transmitting and receiving device 11 is a transmitting and receiving device applied to bidirectional communication, and includes the driver 52 for a laser diode, the amplifier 55 connected to the photodiode 13, the average current detector 57 connected to the photodiode 13, and the controller 51. In the normal communication period, a data signal is input into the driver 52. In the non-signal period (period when there is no data signal input), the pattern signal for inspection is output from the driver 52 as a specific pattern. In the non-signal period in which data communication is not performed, when the driver 52 drives the laser diode 12 so that the photodiode 13 receives the signal (FIGS. 7C, 8C, 9C, and 10C) including information (output period T1 of the optical signal), which is related to the displacement (FIGS. 7B, 8B, 9B, and 10B) of the output power of the laser diode 12 from the target value, from another average current detector 67 connected to another photodiode 23 of another transmitting and receiving device 21, the controller 51 adjusts the magnitude of the current signal supplied from the driver 52 to the laser diode 12 based on this information. The second transmitting and receiving device 21 has the same configuration as the first transmitting and receiving device 11, and can function in the same manner as the first transmitting and receiving device 11.

As shown in FIG. 5, the average current detector 57 (67) of each transmitting and receiving device described above includes the low dropout regulator (LDO) (71, 72, and 73) connected to the photodiode 13 (23), the current mirror (72 and 74) including the transistor 72 forming the low dropout regulator (LDO), and the comparator 76 connected to the output side line of the current mirror. The controllers 51 and 61 are connected to the output terminal of each comparator 76, and adjust the outputs of the drivers 52 and 62 for the laser diode according to the output comparison result. The output terminals of the controllers 51 and 61 can be connected to the output adjustment terminals (offset adjustment terminals or gain adjustment terminals) of the drivers 52 and 62 (amplifiers), respectively. Undoubtedly, in order to generate a desired pattern signal for inspection, the output terminals of the controllers 51 and 61 can be connected to the specific pattern generator 53. However, the pattern signal can also be generated inside the controller.

In addition, the average value (FIGS. 8D, 9D, and 10D) of the current signal detected by the average current detector 57 correlates with the output of the optical signal output from the laser diode 12. This is because the level of the optical signal input into the other side average current detector 67 becomes lower if the output of this optical signal is higher than the target value, the optical signal output of the other-side laser diode 22 is changed according to this information (for example, optical signal output excess information), and then the changed optical signal is input into the average current detector 57 on its own side. When this information (for example, optical signal output excess information) is input into the controller 51, it is possible to set the average intensity level and duration of the optical signal pulse according to the information in the next cycle so that the optical signal output approaches the target value.

Over a period of length (T1 (FIG. 9A) or T2 (FIG. 10A)) that depends on the average value of the current signal detected by the average current detector 57, the controller 51 causes a current signal of a specific pattern to be input from the driver 52 on its own side to the laser diode 12 and causes an optical signal of a specific pattern to be output from the laser diode 12.

Factors that increase or decrease the average output from the photodiode 23 include the duration of the optical signal pulse in addition to the average intensity level of the optical signal pulse. When the output average is too high, the average intensity level of the optical signal pulse is reduced in the next cycle in order to reduce the output average. However, for the duration of the optical signal pulse in the next cycle, a case where the duration of the optical signal pulse is set to a short first period (T1) and a case where the duration of the optical signal pulse is set to a long second period (T2) can be considered. In the second cycle P2 of FIG. 9A, the first period T1 is set, and in the second cycle P2 of FIG. 10A, the second period T2 is set. If the amplitude center value of the intensity of the optical signal is reduced and the duration is reduced, the average intensity level is greatly reduced, but if the duration is not changed, the average intensity level is slightly reduced. The amount of these reductions can also be adjusted according to the amount of target change in average intensity level. In addition, although the above-described transmitting and receiving system uses feedback control using binary values (high level and low level) output from the comparator of the average current detector, a transmitting and receiving system in which an average current detector outputs continuous values can also be considered.

As described above, the transmitting and receiving system 1 includes the first terminal device 10 and the second terminal device 20. The first terminal device 10 includes the transmitting and receiving device 11, the laser diode 12, the photodiode 13, and the connector 14. The second terminal device 20 includes the transmitting and receiving device 21, the laser diode 22, the photodiode 23, and the connector 24. The laser diode 12 and the photodiode 23 are optically connected to each other through the first optical fiber 30. The laser diode 22 and the photodiode 13 are optically connected to each other through the second optical fiber 40. The transmitting and receiving device 11 includes the controller 51, the driver 52, the specific pattern generator 53, the transmitting signal detector 54, the amplifier 55, the differential amplifier 56, the average current detector 57, and the received signal detector 58. The transmitting and receiving device 21 includes the controller 61, the driver 62, the specific pattern generator 63, the transmitting signal detector 64, the amplifier 65, the differential amplifier 66, the average current detector 67, and the received signal detector 68.

In addition, the first average current detector 57 (FIG. 5) includes the differential amplifier 71, the PMOS transistor 72, the capacitor 73, the PMOS transistor 74, the resistor 75, and the comparator 76. The structure of the second average current detector 67 has a structure in which the photodiode 23 is connected to the element of FIG. 5 instead of the photodiode 13.

What is claimed is:

1. A transmitting and receiving device that performs bidirectional signal transmission to and from the other side transmitting and receiving device, comprising:
   a driver that causes a current signal to be input into a laser diode based on a signal to be transmitted to the other side transmitting and receiving device and causes an optical signal to be output from the laser diode to the other-side photodiode on the other side transmitting and receiving device side;
   an amplifier that receives a current signal output from a photodiode that receives an optical signal arriving from the other-side laser diode on the other side transmitting and receiving device side, converts the current signal into a voltage signal, and outputs the voltage signal;
   an average current detector that detects an average value of the current signal output from the photodiode; and
   a controller that controls an input of a current signal from the driver to the laser diode,
   wherein, in a non-signal period in which there is no signal to be transmitted and received to and from the other side transmitting and receiving device, the controller causes a current signal to be input from the driver to the laser diode, causes an optical signal to be output from the laser diode, and when an optical signal of a specific pattern output from the other-side laser diode over a period reaches the photodiode, a length of the period depending on an average value of a current signal output from the other-side photodiode that receives the optical signal from the laser diode, the controller adjusts a magnitude of the current signal input from the driver to the laser diode based on the length of the period of the optical signal of the specific pattern.

2. The transmitting and receiving device according to claim 1,
   wherein, over a period of length that depends on the average value of the current signal detected by the average current detector, a current signal of a specific pattern is input from the driver to the laser diode, and an optical signal of a specific pattern is output from the laser diode.

3. The transmitting and receiving device according to claim 1,
   wherein the optical signal of the specific pattern has a power that repeats increasing and decreasing with respect to power before and after a period of the specific pattern.

4. The transmitting and receiving device according to claim 1,
   wherein the optical signal of the specific pattern has a power different from power before and after a period of the specific pattern.

5. The transmitting and receiving device according to claim 1,
   wherein the average current detector includes:
   a low dropout regulator (LDO) connected to the photodiode;
   a current mirror including a transistor forming the low dropout regulator (LDO); and
   a comparator connected to an output side line of the current mirror.

6. A terminal device, comprising:
the transmitting and receiving device according to claim 1;
the laser diode that receives a current signal from the driver of the transmitting and receiving device and outputs an optical signal; and
the photodiode that receives the optical signal and outputs a current signal to the amplifier of the transmitting and receiving device.

7. A transmitting and receiving system, comprising:
the transmitting and receiving device according to claim 1; and
the other side transmitting and receiving device,
wherein a first terminal device including the transmitting and receiving device includes:
the laser diode that receives a current signal from the driver of the transmitting and receiving device and outputs an optical signal; and
the photodiode that receives an optical signal and outputs a current signal to the amplifier of the transmitting and receiving device,
a second terminal device including the other side transmitting and receiving device includes:
the other-side laser diode that receives a current signal from a driver of the other side transmitting and receiving device and outputs an optical signal; and
the other-side photodiode that receives an optical signal and outputs a current signal to an amplifier of the other side transmitting and receiving device,
the optical signal output from the laser diode of the first terminal device is received by the other-side photodiode of the second terminal device, and
the optical signal output from the other-side laser diode of the second terminal device is received by the photodiode of the first terminal device.

8. The transmitting and receiving system according to claim 7, further comprising:
a first optical fiber that guides the optical signal output from the laser diode of the first terminal device to the other-side photodiode of the second terminal device; and
a second optical fiber that guides the optical signal output from the other-side laser diode of the second terminal device to the photodiode of the first terminal device.

9. A transmitting and receiving device applied to bidirectional communication, comprising:
a driver for a laser diode;
an amplifier connected to a photodiode;
an average current detector connected to the photodiode; and
a controller,
wherein, in a non-signal period in which data communication is not performed, when the driver drives the laser diode so that the photodiode receives a signal including information, which is related to displacement of output power of the laser diode from a target value, from another average current detector connected to another photodiode of another transmitting and receiving device, the controller adjusts a magnitude of a current signal supplied from the driver to the laser diode based on the information.

10. The transmitting and receiving device according to claim 9,
wherein the average current detector includes:
a low dropout regulator (LDO) connected to the photodiode;
a current mirror including a transistor forming the low dropout regulator (LDO); and
a comparator connected to an output side line of the current mirror.

11. A transmitting and receiving device applied to bidirectional communication, comprising:
a driver for a laser diode;
an amplifier connected to a photodiode;
a low dropout regulator (LDO) connected to the photodiode;
a current mirror including a transistor forming the low dropout regulator (LDO);
a comparator connected to an output side line of the current mirror; and
a controller connected to an output terminal of the comparator and an output adjustment terminal of the driver.

* * * * *